Nov. 7, 1961  F. KARGER  3,008,071
ADJUSTMENT AND MAINTENANCE OF CONSTANT
PERIPHERAL SPEED OF ROTARY MACHINES
Filed Oct. 29, 1956  3 Sheets-Sheet 1
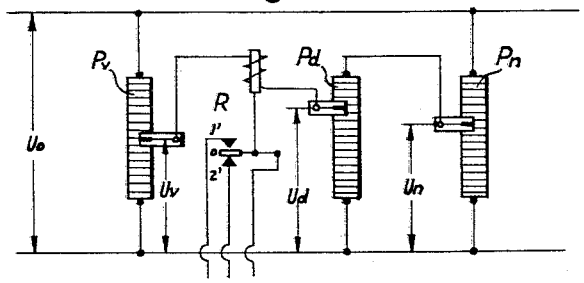
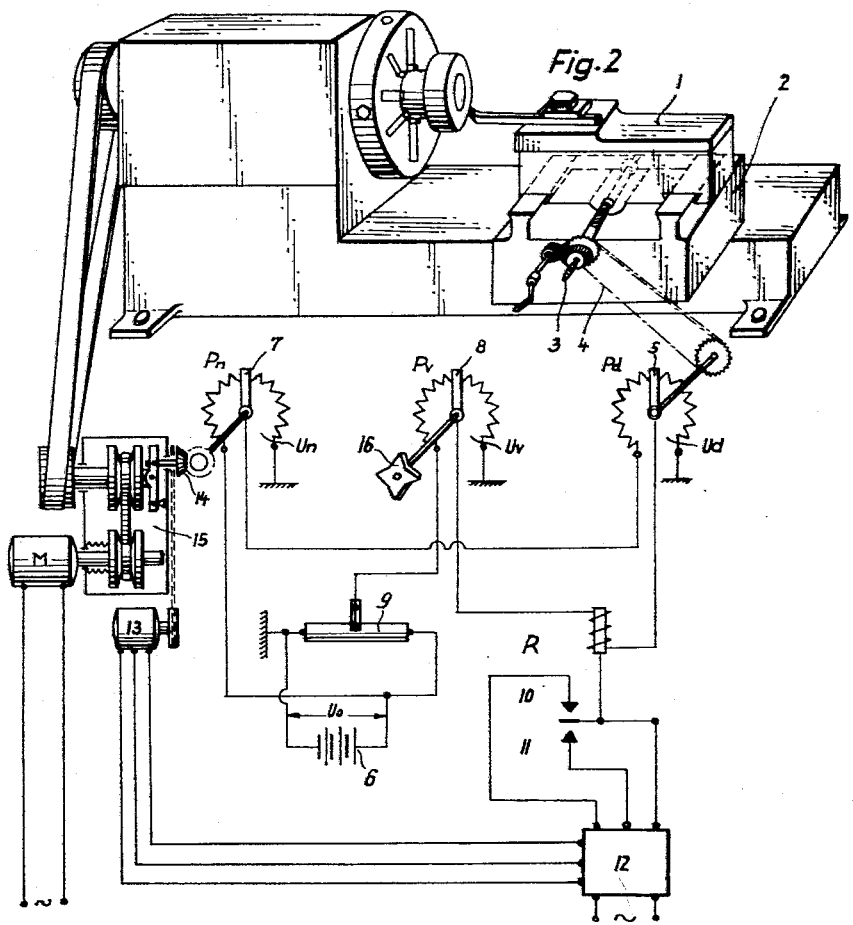
INVENTOR.
FRITZ KARGER
BY
*Bailey, Stephens & Huettig*
ATTORNEYS United States Patent Office 3,008,071
Patented Nov. 7, 1961

3,008,071
ADJUSTMENT AND MAINTENANCE OF CONSTANT PERIPHERAL SPEED OF ROTARY MACHINES
Fritz Karger, Troisdorf, near Koln, Germany, assignor, by mesne assignments, to Fa. Reimers-Getriebe K.G., Zurich, Switzerland, a corporation of Switzerland
Filed Oct. 29, 1956, Ser. No. 619,054
Claims priority, application Germany Apr. 29, 1952
11 Claims. (Cl. 318—11)

This application is a continuation-in-part of my application Serial Number 350,824, now abandoned.

The present invention relates to improvements in rotary machines and machine tools, the peripheral speed of which is to be varied in accordance with a change in diameter of the respective object worked upon or in accordance with the changing position of the tool or feeler relative to the center of rotation of the workpiece.

More particularly, the invention relates to such machines which are driven by a motor or the like which drives the respective machine through an infinitely variable driving gear which is regulated by a control motor or the like which, in turn, is automatically controlled by suitable electric circuits means.

The present invention therefore concerns such machines in which the selected peripheral speed of the workpiece is controlled independently of the power required to rotate the machine to carry out the respective work thereon.

Apparatus of this kind are especially required in lathes and similar cutting machines, including turret and profiling lathes, for automatically varying the rotary speed of the work spindle so as to maintain the desired cutting speed entirely constant despite the varying diameter at which an object is being worked upon in such machine.

It is the primary object of such apparatus according to the invention to obtain a smooth surface finish on the respective workpiece to increase the life span of the tools, and to reduce the length of the nonproductive time of the machine and the time actually required to produce each workpiece.

Such control apparatus are also required for the proper operation of winding machines and the like in which the speed of rotation of the winding drum or other carrier must be automatically regulated so that the feeding rate of the respective material toward or away from such carrier will be held constant despite the increasing or decreasing diameter of the carrier.

The principle governing an apparatus of this type consists in maintaining the peripheral or cutting speed $v$ of the workpiece, the number of revolutions per minute $n$ of the work spindle of the machine, and the working diameter $d$, that is, the particular diameter at which the work is being carried out at any point of time, in a certain relation to each other which is determined by the equation $$d \cdot \pi \cdot n = v = \text{const.}$$

This equation shows that the peripheral speed $v$ may also have any desired preset constants between two limits.

The object of the present invention, namely, to set up and maintain any desired peripheral speed $v$ of a machine of the mentioned kind at a constant rate even though the working diameter $d$ varies, by automatically adjusting the number of revolutions $n$ of the work spindle may be easily and effectively realized according to the invention by providing a first variable electric control element to set up the desired value of the peripheral speed $v$. The outer terminals of this control element are connected with a constant voltage source, while the voltage which is tapped off on this control element at a point intermediate of its ends is supplied to the winding of a relay. The invention further provides a second variable electric control element for determining the actual number of revolutions $n$ of the work spindle of the machine and for being directly controlled in proportion to such value. Both outer terminals of this second control element are likewise connected to the mentioned constant voltage source so as to permit different voltages to be tapped off thereon. The particular voltage thus tapped off on this second control element is then supplied to the ends of the winding of a third variable electric control element. The voltage which is then tapped off on this third control element is adjustable in proportion to the varying working diameter $d$, that is, in the case of a lathe or similar machine, in proportion to the actual distance of the cutting tool from the axis of rotation of the workpiece or, in the case of a winding machine or the like, in proportion with the distance of the feeler from the axis of rotation of the drum or other carrier on which the respective material is being wound. This latter voltage is therefore proportional to the product of these two actual values, namely, the value $n$ and the value $d$, and it is likewise supplied to the winding of the relay. This relay controls the operation of the control motor of the infinitely variable driving gear so that the latter, by varying the number of revolutions $n$ of the machine, will adjust and maintain a certain desired peripheral speed $v$ at the particular point or position of the varying working diameter $d$. The mentioned control elements for varying the voltages may consist either of potentiometers which serve as voltage dividers and are connected to a source of direct current, or of transformers which are connected to a source of alternating current and the ratio of transformation of each of which is variable.

According to the present invention it is advisable to provide a further variable resistance or equivalent element for adjusting the size of the constant voltage supplied to one of the control elements, that is, preferably to that element which is provided for setting up the desired peripheral speed $v$. Such resistance accounts for the factor $\pi$ of the above-mentioned equation and it permits the new control system to be adjusted either manually or automatically in accordance with any changes that might be made in the back-gear ratio of the machine or which might occur in the operating conditions of the machine, that is, particularly, when in a profiling lathe the profile angle is changed, or when in a turret lathe the turret head is swiveled to move a different tool requiring a different cutting speed into engagement with the workpiece.

Another feature of the present invention consists in providing at least one of the mentioned control elements with additional compensating elements which are adapted to influence the size of the voltages applied to the relay in accordance with or responsive to the size of the voltages tapped off on the control elements. Such compensating elements will permit an influence upon the sensitivity of the control operation of the new system, and within certain limits they will also permit a continuous change of the cutting speed as once adjusted in accordance with an increasing or decreasing working diameter since the voltages tapped off on the control elements will then be influenced by these compensating elements the more the smaller these voltages are.

When applying the new control system to lathes and similar rotary machines it has further been found advisable to provide a pole changing switch for changing the polarity of the voltage tapped off on the control element for regulating the number of revolutions $n$. Such switch may reverse the polarity either by being operated manually or automatically, that is, when the control element which is responsive to the changing working diameter $d$ has reached a certain position of adjustment. Its presence is of advantage in a lathe particularly when the cutting tool, as seen from the operator's side of the machine, is supposed to work in front of, as well as behind the central rotary axis of the workpiece. In the event that the cutting tool operates on the workpiece in front of the rotary axis thereof, the movement of the cross slide carrying the tool toward such axis results in a reduction of the working diameter, that is, of the diameter on the workpiece at which the cutting tool engages the same to carry out the work, while the further movement thereof in the same direction and beyond the rotary axis results in an increasing working diameter. The pole changing switch is therefore required to operate at the instant when the cutting edge of the tool crosses the rotary axis. Such operation of the switch may preferably be effected automatically by the transverse movement of the cross slide itself. However, if a lathe in which the cutting tool normally operates in front of the rotary axis is to be converted into a profiling lathe in which the cutting tool usually operates behind the rotary axis, the pole changing switch may be operated manually. The same is true for a turret lathe in which one of the cutting tools has to operate in front of the rotary axis and another tool behind such axis.

A further modification of the invention consists in the provision of means for making the speed of the control motor of the infinitely variable driving gear dependent upon the size or degree of the difference between the voltages tapped off on the control elements for the working diameter $d$ and the peripheral speed $v$. This is preferably done in such a manner that the speed of the control motor is made to increase in accordance with any increase in such differential voltage. In such case it is necessary to replace the intermittent on-off control by the relay by a continuous control, so that the deviation of the actual value of the number of revolutions $n$ from the intended value thereof will be compensated the more quickly the greater such deviation might be. The control motor may then even be one of constant speed if it is provided with a variable gear, the transmission ratio of which may be controlled in accordance with the size of the mentioned differential voltage.

Further objects, features, and advantages of the present invention will appear from the following detailed description thereof, particularly when read with reference to the accompanying drawings, in which—

FIG. 1 shows a basic circuit diagram showing the underlying principle of the invention;

FIG. 2 shows diagrammatically an apparatus according to the invention as applied to a lathe;

FIG. 5 shows a control system similar to that in FIG. 1, in which the potentiometers are replaced by variable transformers; while

Figure 3:
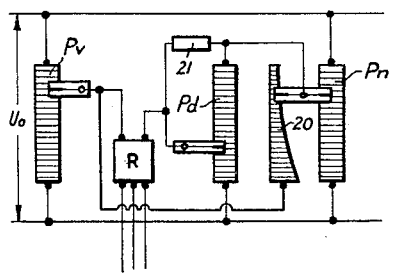
FIG. 3 shows a modification of the circuit according to FIG. 1 with additional means for adjusting the control characteristic thereof.

Referring to the drawings, and first particularly to FIG. 1, the main control elements consist of three variable potentiometers $P_d$, $P_v$, and $P_n$ for controlling the working diameter $d$, the peripheral speed $v$, and the number of revolutions $n$, respectively. The tapping or wiper arm of potentiometer $P_v$ may be adjusted manually in accordance with the desired cutting speed $v$, while the position of the wiper arm of potentiometer $P_d$ is controlled by the movements of the element, the position of which is determined by the changing diameter of the work, for example, the position of the cross slide which changes in accordance with the position of the cutting tool relative to the rotary axis of the workpiece, or the feeler or feeler roll on a winding machine which ascertains the diameter of a material wound on a winding drum or other carrier. The wiper arm of potentiometer $P_n$ is adjusted by the speed regulating device of the infinitely variable driving gear which transmits the rotary power of the main motor to the machine. The outer ends of potentiometers $P_v$ and $P_n$ are directly connected to the constant voltage $U_o$, while a voltage $U_v$ is tapped off potentiometer $P_v$, and a voltage $U_n$ off potentiometer $P_n$. Potentiometer $P_d$ is connected to the wiper of potentiometer $P_n$ and is thus supplied with the voltage $U_n$. The voltage tapped off potentiometer $P_d$ may be called $U_d$. If we identify the adjusted value of potentiometer $P_n$ by "$x$," that of potentiometer $P_d$ by "$y$", and the value set on potentiometer $P_v$ by "$z$," and if the adjusted value of each potentiometer is the ratio of the resistance between the tapping point and the lower terminal of such potentiometer as compared with the total resistance thereof, the voltages $U_d$, $U_n$, and $U_v$ will have the following relation to each other:

$$U_d = y.U_n = x.y.U_o = U_v$$
$$U_v = z.U_o$$

or $$x.y = z$$

Thus it will be seen that the working diameter $d$, the number of revolutions $n$, and the peripheral speed $v$ are in the desired relation to each other as mentioned in the beginning and as expressed by the equation $$d.\pi.n = v = \text{const.}$$

Furthermore, as seen in FIG. 1, the wipers of potentiometers $P_v$ and $P_d$ are connected to the two ends of the winding of a relay R, the armature of which may assume three different positions, namely, a central inoperative position 0 and two operative positions 1' and 2'. When relay R is in one or the other of these operative positions, the control motor of the infinitely variable driving gear, not shown in FIG. 1, and of the type as shown, for example, at 13 in FIG. 2, will be connected so as to rotate in one or the other direction. The three potentiometers $P_v$, $P_d$, and $P_n$ form a modified Wheatstone bridge, one diagonal of which is connected to the supply voltage $U_o$, while the other diagonal is connected to relay R. Such circuit connection permits a control operation of an extremely high sensitivity and accuracy.

In the circuit as shown in FIG. 1, the right-hand terminal of the winding of relay R receives the potential $U_d$ with respect to the lower end of the potentiometers, while the left terminal receives the potential $U_v$. As long as the condition $U_d = U_v$ is fulfilled, relay R remains deenergized and at rest. The condition $U_d = U_v$ means that means that the potential $U_d$ representing the product of the actual values of $d$ and $n$ (and of the factor $\pi$) corresponds to the potential $U_v$ which represents the desired value $v$. If the working diameter $d$ changes, the position of the wiper on potentiometer $P_d$ will change accordingly and result in a change in the potential $U_d$. The potential difference thus arising at the terminals of relay R will then produce a flow of current through this relay and energize the same so as to close one of the operating contacts 1' or 2'. This, in turn, will connect the control motor 13 of the infinitely variable driving gear so as to change the rate of the driving speed until the resulting simultaneous adjustment of potentiometer $P_n$, which constitutes an answer-back signal of the effected change in the driving speed, again fulfills the condition $U_d = y$. $U_n = U_v$, so that relay R will again be deenergized.

FIG. 2 shows the control system according to FIG. 1 as being applied to a lathe for automatically maintaining the cutting speed at a constant rate despite the change in diameter of the workpiece or the change in the position of the cutting tool relative to the axis of rotation of the workpiece. The cross slide 1 of the lathe is mounted as usual on a slide carriage 2 and is moved transversely of the workpiece by a cross-feed spindle 3. The rotation of spindle 3 is then transmitted by means of a nonslip gear drive 4, for example, a chain gear drive, to the tapping arm 5 of potentiometer $P_d$. One end of this potentiometer is grounded and thus connected with the grounded terminal of a voltage source 6 having a constant voltage $U_0$, while the other end is connected with the wiper arm 7 of another potentiometer $P_n$, one end of which is again grounded and thus connected to the grounded terminal of voltage source 6, while the other end is directly connected to the other terminal thereof. The wiper arm 7 of potentiometer $P_n$ is mechanically connected with the adjusting mechanism of an infinitely variable gear 15 of conventional design, for example, by means of a bevel gear drive 14. The third potentiometer $P_v$ with a wiper arm 8 is again grounded at one end, while its other end is connected with the adjustable wiper of a voltage divider or potentiometer 9 which is connected to both terminals of voltage source 6. Wiper 8 of potentiometer $P_v$ has a control knob 16 for adjusting the desired peripheral speed $v$, that is, in the case of a lathe, the cutting speed thereof. Wipers 5 and 8 of potentiometers $P_d$ and $P_v$ are connected to the opposite ends of the winding of a polarized relay R.

The operation of the control system according to FIG. 2 is similar to that as described with reference to FIG. 1. If at a certain number of revolutions $n$ the actual cutting speed $v$ corresponds to the speed set by control knob 16, the voltage $U_d = y \cdot U_n$ tapped on wiper 5 resulting from the connection of potentiometers $P_n$ and $P_d$ in series, is equal to the voltage $U_v$ on wiper 8 of potentiometer $P_v$. Thus, there will not be any potential difference at the ends of the winding of relay R, and the latter will remain in its central inoperative position. As soon as the working diameter $d$ changes, or one of the tapped voltages $U_d$ or $U_v$ changes when another cutting speed $v$ is set up, a potential difference will occur on relay R and, depending upon the direction of the flow of current in the relay winding, one or the other relay contact 10 or 11 will be closed. A reversing switch or contactor 12 then automatically connects control motor 13 of the infinitely variable driving gear 15 so as to increase or decrease the number of revolutions $n$ until the preset cutting speed $v$ has been reached and the voltage $U_d = y \cdot U_n$ on wiper 5 of potentiometer $P_d$ is again equal to voltage $U_v$.

Potentiometer 9 is provided to account for the factor $\pi$ of the above-mentioned equation and to permit the voltage on potentiometer $P_v$ to be varied by certain adjustable values. It is thus possible to carry out a precision adjustment of the control system or to adapt the same to special conditions, for example, to the gear ratios of a particular lathe. Potentiometer 9 may for this purpose have several tapping points marked thereon between which the wiper thereof may be changed or be provided with several fixed or preset tapping points connected to suitable control means to adjust the resistance of the potentiometer to the respective gear ratio used in the lathe or to particular operating conditions thereof. For the same purpose, fixed or variable resistances or potentiometers may also be additionally connected to the potentiometers $P_d$ and $P_n$, and suitable means may be provided to connect such resistances automatically to one of the potentiometers, for example, when the back gears of the machine have to be changed from one gear stage to the other or when the tool head of a turret lathe is swiveled for the next operation on the workpiece. Likewise a resistance of a size depending upon the inclined position of the cross slide of the lathe may be connected in front of one of the potentiometers $P_n$, $P_v$, or $P_d$, or equivalent means may be provided to account for the change in the relation between the movement of the cross slide and the value of the working diameter $d$ by the cosine $\alpha$ factor.

The circuit diagram as shown in FIG. 3 illustrates a compensating element 20, for example, a variable resistance having, for instance, a logarithmic or exponential characteristic, which may be adjusted simultaneously with the wiper of potentiometer $P_n$. Resistance 20 bridges the potentiometer $P_d$ as well as relay R and therefore reduces the influence of potentiometers $P_n$ and $P_d$ upon relay R in accordance with the setting of the infinitely variable driving gear. The sensitivity of the entire control system and thus the speed of adjustment thereof is therefore differently affected depending upon the respective gear reduction set up in the machine for a particular job, and may thus be adapted to the special requirements of the infinitely variable driving gear. Since the number of revolutions of the machine is adjusted in accordance with the respective working diameter, that is, the diameter at which the cutting tool engages with and acts upon the workpiece, such adjustment also depends indirectly upon such diameter. If, however, the variable resistance 20 is connected to the wiper of potentiometer $P_d$, the sensitivity of the adjustment and the period within which it is carried out depends directly upon the working diameter. A further possibility of influencing the control action of the new system consists in the provision of a compensating element 21 in the form of a fixed resistance, as indicated in FIG. 3, which bridges the potentiometer $P_d$. If the latter is adjusted to tap off only a comparatively small portion of the voltage $U_n$, the effect of resistance 21 bridging the potentiometer $P_d$ will be very small since the voltage $U_n \cdot y = U_d$ applied to relay R will be changed only slightly. However, the greater the portion $y$ of this voltage is made, the greater will also be the change in the total voltage $U_d$ when potentiometer $P_d$ is bridged over by resistance 21. The insertion of the resistance 21 therefore means that the more closely the diameter $d$ approaches one of its limit values, the greater will be the deviation from the intended speed as set up on potentiometer $P_v$.

Figure 4:
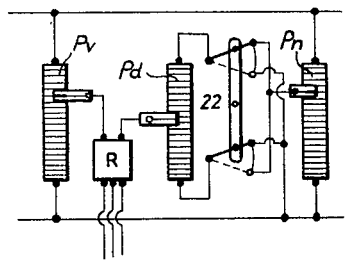
FIG. 4 shows a further modification of control circuit.

FIG. 4 illustrates diagrammatically another modified circuit according to the invention in which the polarity of potentiometer $P_d$ may be reversed relative to potentiometer $P_n$ by means of a double-throw switch 22. This will be necessary if without any change in the direction of movement of the cross slide, the cutting edge of the tool has to work first in front of and then behind the center of rotation of the lathe spindle or vice versa, since the working diameter or the position of the tool relative to the center of rotation of the work will then first decrease and then increase, or vice versa. The use of such a double-throw switch 22 is also required if, for example, a lathe with a tool adapted to work in front of the rotary axis is to be converted to serve as a copying or profiling lathe in which the tool works behind the rotary axis.

Figure 5:
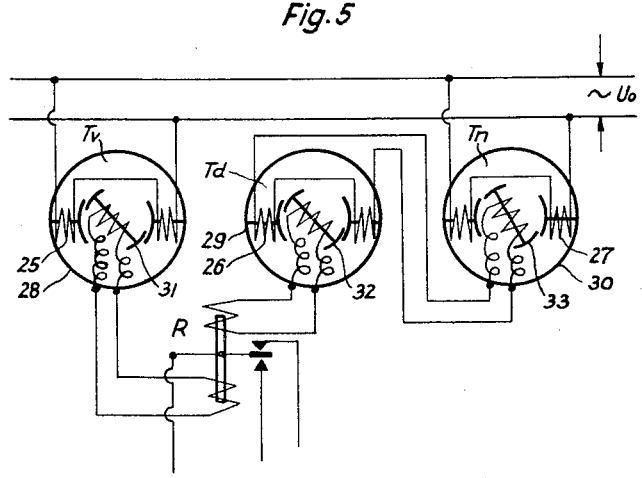

FIG. 5 illustrates diagrammatically a further modification of the invention in which the control voltages are produced by variable transformers, $T_d$, $T_v$, and $T_n$ corresponding to the potentiometers $P_d$, $P_v$, and $P_n$, respectively, as shown in FIGS. 1 to 4. The primary windings 25, 26, and 27 are provided on the stationary iron cores or stators 28, 29, and 30, respectively, while the secondary windings are provided on three cores 31, 32, and 33, respectively, of double-T shape which are rotatable about an angle of about 60 to 90°. In place of three separate transformers, it is also possible to use a single multiple transformer with several secondary windings which are adjustable independently of each other. Furthermore, such transformers may also be used in which both the primary and secondary windings are stationary but in which the core is made adjustable so that each pair of windings will thereby be coupled so as to be variable relative to each other. The adjustable elements of the transformers, by means of which the relation of the output voltage to the input voltage may be varied and controlled, may be adjusted in the same manner as shown in FIG. 2. The input side of transformer $T_d$ is connected with the output side of transformer $T_n$, while the input side of the latter, as well as the input side of transformer $T_v$ is connected to a constant source $U_0$ of alternating current. In the particular embodiment as shown in FIG. 5, the primary windings of transformers $T_v$ and $T_n$ are connected directly to the constant alternating current $U_0$, while the primary winding of transformer $T_d$ is energized through the secondary winding of transformer $T_n$. However, just as the potentiometers $P_d$ and $P_n$ in FIGS. 1 to 4 may be exchanged for each other, transformers $T_d$ and $T_n$ may also be exchanged for one another. The required characteristic of transformation may be obtained by a suitable winding and a suitable construction of the pole shoes, as well as of the mechanical transmission elements. The phase displacements arising at different armature positions may be taken into account by a suitable design of the transformers.

The secondary windings of transformers $T_d$ and $T_v$ are each connected with one winding of a differential relay R so that the secondary voltages of these two transformers act upon the relay armature in opposite directions to each other. The two relay windings are balanced so that, when the actual speed corresponds to the intended peripheral speed, relay R will be in its central inoperative position. If the peripheral speed varies, the relation of the currents in the two relay windings will be changed, and the relay armature will close one of its contacts to operate the control motor 13 in the proper direction until the infinitely variable driving gear 15 has increased or decreased the speed of the lathe spindle so as to correspond to the desired peripheral speed. The arrangement described with regard to FIG. 4 for reversing the polarity of one of the potentiometers may be replaced in the embodiment according to FIG. 5 by the simple procedure of turning the armature of the respective transformer beyond its dead-center position toward the adjacent quadrant. In order to make the controlling operation under different working conditions as uniform as possible, the intermittent on-off control effected by relay R may also be replaced by a continuous control so that the period required for the adjustment of the infinitely variable driving gear will then depend upon the degree of the difference between the computed electrical values. Thus, for example, by suitably regulating the field intensity of the control motor of the infinitely variable driving gear, the speed of this motor may be made to increase in accordance with the differential value. Another possibility consists in connecting additional means between the control motor and the infinitely variable driving gear, for example, a control gear which itself is preferably infinitely variable and the control element of which is controlled by the differential value. The control impulses for varying the control speed may also be supplied by several relay stages which are connected successively when the voltage difference increases.

Figure 6:
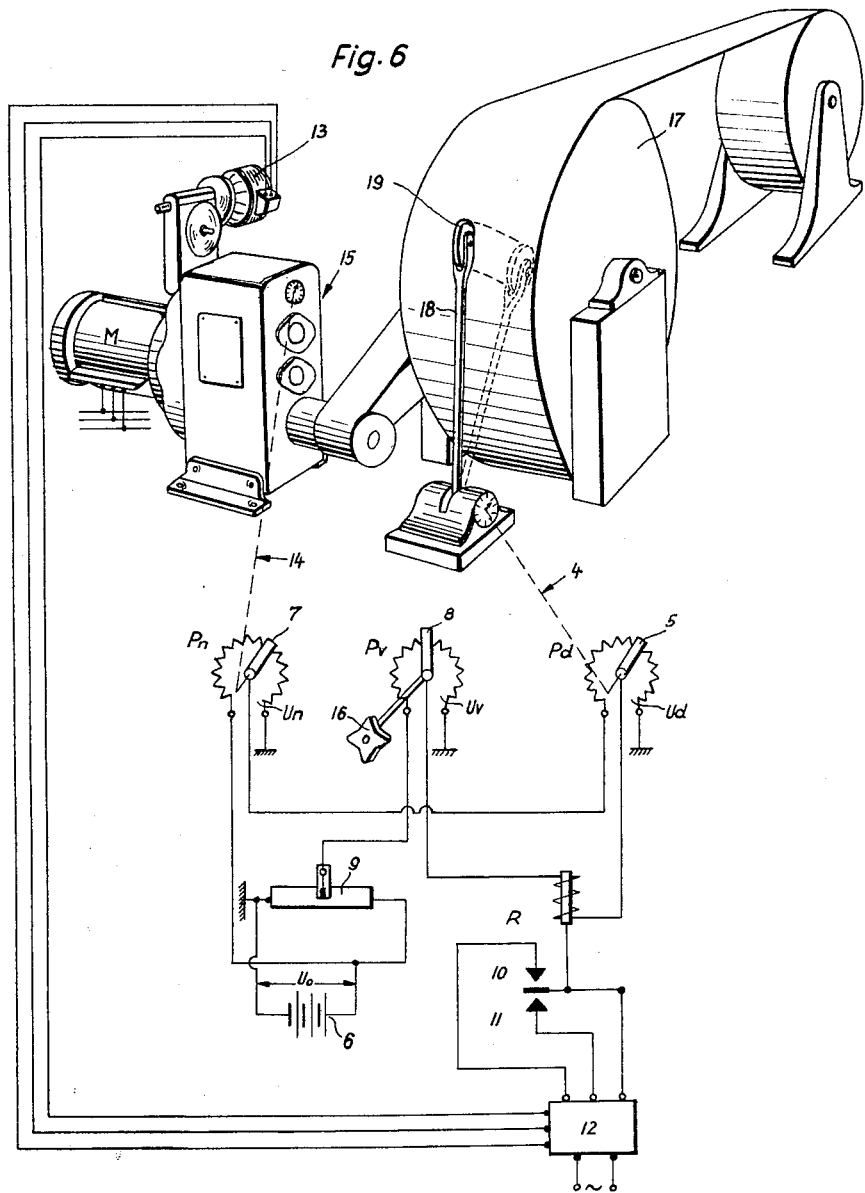
FIG. 6 shows an apparatus similar to that shown in FIG. 2, but as being applied to a winding machine.

FIG. 6 finally illustrates diagrammatically the application of the control system shown in FIGS. 1 and 2 to a winding machine in which a web of material or continuous layers thereof are wound upon or unwound from a roller or drum and in which the speed of a motor M for driving drum 17 is adjusted by an infinitely variable driving gear 15 of any suitable type, for example, as indicated in FIG. 2, and in accordance with the change in the diameter of drum 17 caused by the winding or unwinding operation, so that the peripheral speed of drum 17 and thus also the speed of the web or material while being wound or unwound will always be constant. While in a lathe or similar machine as shown in FIG. 2 the operation of potentiometer $P_d$ is controlled by the position of the cross slide and the cutting tool thereon relative to the axis of rotation of the workpiece, as well as by the change in such position as the work progresses, potentiometer $P_d$ is controlled in FIG. 3 by the varying angular position of a feeler arm 18 carrying a roller 19 in resilient engagement with the surface of the web on drum 17. For this purpose, the shaft of wiper 5 may be connected to the pivoting shaft of feeler arm 18 either directly or by a suitable gear transmission. Wiper 5 may thus also serve as a pointer for visually indicating the amount of material wound upon or unwound from drum 17. Since the control conditions applicable to a winding machine are very similar to those of a lathe and the control of the cutting speed thereof, all that has been said above with regard to FIGS. 1 to 5 is substantially applicable also to FIG. 6.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An apparatus for adjusting and maintaining the peripheral speed of a rotary machine having a rotor turnable about an axis and driven by a source of power through an infinitely variable change-speed gear connected to said driving source and said machine for transmitting said power to said machine and including a control motor for controlling the adjusting means of said gear, comprising a part mounted on the machine for movement towards and from said axis, a relay operatively connected to said motor to control the same, a source of constant voltage, a first control element for setting up a certain desired value of said peripheral speed, said control element being connected to one terminal of said voltage source and having first adjustable member for tapping off a portion of said voltage on said element which is proportional to said desired value, a second control element connected to the other terminal of said voltage source, said second control element having a second adjustable member for tapping off a portion of said voltage on said second element operatively connected to said adjusting means of said change-speed gear so as to be controlled in proportion to the number of revolutions of said rotor to tap off a voltage proportional to the peripheral speed, a third electrical control element, said second adjustable member being electrically connected to said third control element for supplying the voltage tapped off thereby on said second control element to said third control element, said third control element also having a third adjustable member for tapping off a portion of the voltage supplied thereto, said third member being operatively connected to said movable part to move in response to movements of said movable part to tap off a voltage proportional to the distance of said part from the axis, said first adjustable member and said third adjustable member being connected in opposition to each other to the winding of said relay, said relay controlling a switch for said control motor so that the latter by displacement of said adjusting means of said gear acts to vary the number of revolutions of said machine and to maintain constant the product of the longitudinal speed of rotation of the rotor times the distance of the said moveable member from the rotor axis.

2. The combination as defined in claim 1, wherein said constant voltage source is one of a direct current, and wherein each of said control elements comprises a potentiometer serving as a voltage divider and having a movable wiper for tapping off a portion of the voltage supplied to the ends thereof.

3. The combination as defined in claim 1, wherein said constant voltage source is one of an alternating current, and wherein each of said control elements comprises a transformer having a variable ratio of transformation to provide the tapped voltage.

4. The combination as defined in claim 1, further comprising a further variable electric control member connected in series with one of said control elements for adjusting the voltage supplied thereto from said voltage source, and means for adjusting said control member so as to adapt the operation of said apparatus to different conditions of operation of said machine.

5. The combination as defined in claim 1, further comprising a variable resistance element connected in series with said first control element adapted to set up the desired peripheral speed for adjusting the voltage supplied to said control element from said voltage source, and means for manually adjusting said resistance element so as to adapt the operation of said apparatus to different conditions of operation of said machine.

6. The combination as defined in claim 1 in which the power is transmitted from the change-speed gear to the machine through a shiftable back-gear further comprising a variable resistance element connected in series with said first control element adapted to set up the desired peripheral speed for adjusting the voltage supplied to said control element from said voltage source, and means for automatically adjusting said resistance element so as to adapt the operation of said apparatus to different conditions of operation of said machine including changes in the gear ratio of the back-gear of said machine.

7. The combination as defined in claim 1, further comprising at least one compensating member connected to the adjustable tapping member of at least one of said control elements for affecting the size of the voltage supplied to the winding of said relay in proportion to the size of the voltage supplied from at least one of said tapping members.

8. The combination as defined in claim 1, further comprising a pole changing switch connected to said tapping member of said second control element adapted to determine the actual number of revolutions of said machine for reversing the polarity of the voltage tapped off by said member.

9. The combination as defined in claim 1, further comprising a pole changing switch connected to said tapping member of said second control element adapted to determine the actual number of revolutions of said machine for automatically reversing the polarity of the voltage tapped off by said member when said third control element reaches a certain position of adjustment.

10. An apparatus for adjusting and maintaining the peripheral speed of a rotary machine having a rotor turnable about an axis and driven by a source of power through an infinitely variable change-speed gear connected to said driving source and said machine for transmitting said power to said machine and including a control motor for controlling the adjusting means of said gear, comprising a part mounted on the machine for movement towards and from said axis, voltage responsive means operatively connected to said motor to control the same, a source of constant voltage, a first control element for setting up a certain desired value of said peripheral speed, said control element being connected to one terminal of said voltage source and having a first adjustable member for tapping off a portion of said voltage on said element which is proportional to said desired value, a second control element connected to the other terminal of said voltage source, said second control element having a second adjustable member for tapping off a portion of said voltage on said second element operatively connected to said adjusting means of said change-speed gear so as to be controlled in proportion to the number of revolutions of said rotor to tap off a voltage proportional to the peripheral speed, a third electrical control element, said second adjustable member being electrically connected to said third control element for supplying the voltage tapped off thereby on said second control element to said third control element, said third control element having a third adjustable member for tapping off a portion of the voltage supplied thereto, said third member being operatively connected to said movable part to move in response to movements of said movable part to tap off a voltage proportional to the distance of said part from the axis, said first adjustable member and said third adjustable member being connected in opposition to each other to said voltage responsive means, to maintain constant the product of the angular speed of rotation of the rotor times the distance of the said moveable member from the rotor axis.

11. Apparatus for regulating the peripheral speed of a rotary machine having a rotor mounted to turn about an axis and driven by a source of rotary power of constant speed through an infinitely variable change-speed mechanism, comprising a part mounted on the machine for movement towards and from said axis, a servo-motor operatively connected to said change-speed mechanism for changing the setting thereof, voltage-responsive means operatively connected to said servo-motor to control the same, means to furnish to said voltage responsive means a first voltage of one direction constituting a reference voltage of a value corresponding to the desired peripheral speed, means operatively connected to said change-speed mechanism to furnish a second voltage variable in accordance with the setting of the change-speed mechanism, said second voltage being proportional to the actual number of revolutions of said rotor, and means operatively connected with said movable part to vary said second voltage in accordance with the position of said part, said second voltage, when so varied, having a value proportional to the product of said actual number of revolutions of said rotor times the distance of said movable part from the rotor axis and being furnished to said voltage responsive means in a direction opposite to that of said first voltage, whereby when said first voltage and said varied second voltage produce a difference voltage said voltage responsive means operates said servo-motor to alter the output speed of said change speed mechanism.

References Cited in the file of this patent

UNITED STATES PATENTS

| | | |
|---|---|---|
| 798,391 | Clark | Aug. 29, 1905 |
| 1,526,371 | Potts | Feb. 17, 1925 |
| 1,709,674 | Kuhl | Apr. 16, 1929 |
| 2,350,913 | Mercer | June 6, 1944 |
| 2,489,725 | Rutemiller | Nov. 29, 1949 |
| 2,512,008 | Bickel | June 20, 1950 |
| 2,600,988 | Greene et al. | June 17, 1952 |
| 2,647,965 | Michie | Aug. 4, 1953 |